(12) United States Patent
Walker et al.

(10) Patent No.: US 6,975,617 B2
(45) Date of Patent: Dec. 13, 2005

(54) NETWORK MONITORING SYSTEM WITH BUILT-IN MONITORING DATA GATHERING

(75) Inventors: Richard C. Walker, Palo Alto, CA (US); Bharadwaj Amrutur, Santa Clara, CA (US); Peter Mottishaw, West Lothian (GB); C. Steven Joiner, Cupertino, CA (US); Larry A. Chesler, Loveland, CA (US); Ian Hardcastle, Sunnyvale, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 880 days.

(21) Appl. No.: 09/816,605

(22) Filed: Mar. 23, 2001

(65) Prior Publication Data

US 2001/0039580 A1    Nov. 8, 2001

Related U.S. Application Data

(60) Provisional application No. 60/201,614, filed on May 3, 2000.

(51) Int. Cl.[7] ............................................. H04J 3/24
(52) U.S. Cl. ................... 370/349; 370/355; 370/390; 370/471
(58) Field of Search .............................. 370/252, 242, 370/253, 349, 352, 353, 354, 355, 389, 390, 370/392, 401, 400

(56) References Cited

U.S. PATENT DOCUMENTS

| | | | |
|---|---|---|---|
| 5,646,941 A * | 7/1997 | Nishimura et al. | 370/389 |
| 5,787,253 A | 7/1998 | McCreery et al. | |
| 5,793,976 A | 8/1998 | Chen et al. | |
| 5,812,528 A | 9/1998 | VanDervort | |
| 6,363,056 B1 * | 3/2002 | Beigi et al. | 370/252 |
| 6,493,340 B1 * | 12/2002 | Kawanaka | 370/392 |

FOREIGN PATENT DOCUMENTS

EP    0 477 448 A1    4/1992

OTHER PUBLICATIONS

Miyaho, Noriharu et al., "ATM Switching Node System Technology for Effective Maintainabilty", Global Telecommunications Conference, 1995, IEEE Singapore Nov. 13-17, 1995, pp. 1719-1723.

* cited by examiner

*Primary Examiner*—Chi Pham
*Assistant Examiner*—Alexander O. Boakye
(74) *Attorney, Agent, or Firm*—Ian Hardcastle (57) ABSTRACT

The network monitoring system comprises a network router with built-in monitoring data gathering. The network router includes channels through which data pass in packets. Each of the packets includes a packet header. The network router additionally includes a header copier and a packet generator. The header copier generates a header copy from the packet header of at least some of the packets. The packet generator receives the header copies and forms monitoring data packets from them. Each monitoring data packet additionally represents temporal data relating to the header copies included in it. A method of obtaining performance data relating to a data transmission network that includes a node passes data through the node in packets. Each of the packets includes a packet header. At least some of the packet headers are copied to obtain respective header copies as monitoring data from which monitoring data packets are formed. The monitoring data packets additionally represent temporal data relating to the header copies included in them. The monitoring data packets are transmitted and the performance data are generated from the monitoring data contained in the monitoring data packets.

32 Claims, 7 Drawing Sheets

NETWORK MONITORING SYSTEM WITH BUILT-IN MONITORING DATA GATHERING

This application claims benefit of provisional application 60/201,614, filed May 3, 2000.

BACKGROUND OF THE INVENTION

Network routers control the flow of data traffic in networks, between networks and between networks and end users. Basic information on routers and their use in networks is disclosed by Radia Perlman in the book entitled INTERCONNECTIONS, the second edition of which was published by Addison-Wesley in 1999.

Figure 1A:
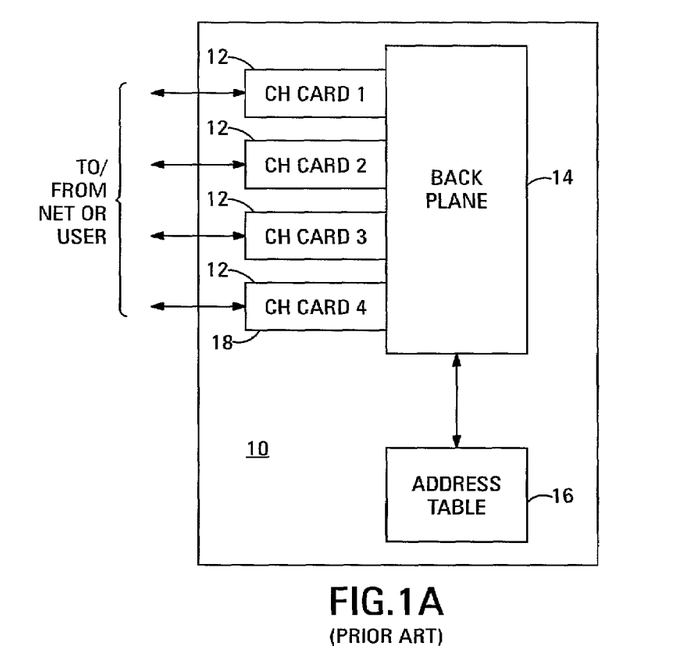
FIG. 1A is a block diagram of a conventional network router.

FIG. 1A shows the structure of a typical router 10. The router is composed of a number of channel cards 12 connected to the backplane 14. The channel cards receive packets of data from and transmit packets of data to the user or the network. The channel cards additionally receive packets of data from and transmit packets of data to the backplane. The packets of data transmitted to or from the backplane differ from those transmitted to and from the network or user and will be called envelopes to distinguish them.

The backplane 14 transmits envelopes of data received from any of the channel cards 12 to a specific channel of any of the channel cards in accordance with a channel address included in the header of the envelopes. The channel card determines the channel address in response to destination address data in the headers of the packets and address information stored in the address table 16. The address table is hierarchical and stores address information that indicates the network or user connections made to each channel of the router 10. The address information is detailed with respect to the domains of users connected to the channels and are more general with respect to networks connected to the channels.

Figure 1B:
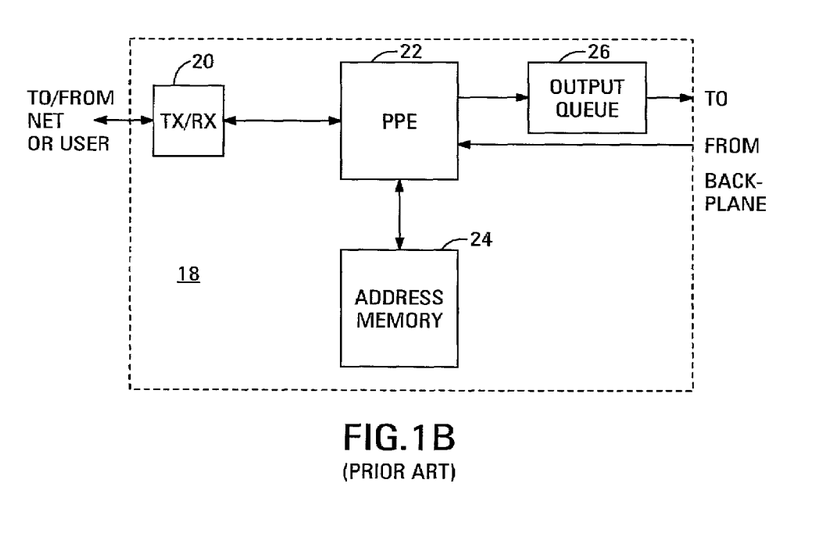
FIG. 1B is a block diagram of a channel card of the conventional router shown in FIG. 1A.

FIG. 1B shows details of the exemplary channel card 12. The channel card is composed of the transmitter/receiver 20, the packet processing engine (PPE) 22, the address memory 24 and the output queue buffer 26. More than one transmitter/receiver may be connected to the packet processing engine, in which case the channel card handles more than one channel. In some applications, the transmitter/receiver may be a transmitter only or a receiver only and the term transmitter/receiver will be understood to cover all these possibilities.

The transmitter/receiver (TX/RX) 20 transmits packets of data to, and receives packets of data from, the user or the network connected to it. The transmitter/receiver receives packets of data for transmission from, and transmits received packets of data to, the packet processing engine 22.

The address memory 24 stores all, or a subset of, the address information stored in the address table 16 (FIG. 1A). The address information is transferred from the address table to the address memory via the backplane 14 and the PPE 22. The address information indicates the network address of the network device connected to each of the channels of the router 10. For example, the address information might indicate that a packet with a particular destination address should be transmitted to the m-th channel on channel card n.

The PPE 22 performs a framing operation on the data stream received from the transmitter/receiver 20 to determine the boundaries of the packets. Once the boundaries of the packets are determined, the PPE performs a header read operation to read the header of each packet. The header includes data indicating the destination, in network terms, of the packet and the length of the packet. The PPE inserts the packet into one or more envelopes suitable for transmission through the router 10. For example, the envelopes may be packet-like structures having a fixed length.

The PPE 22 additionally reads the destination address from the header of the packet and, using address data read from the address memory 24 determines a destination channel in the router 10 for the envelopes derived from the packet. The PPE adds a header to each envelope indicating the address of the destination channel, and feeds the envelopes to the output queue 26. The output queue temporarily stores the envelopes until they can be transmitted via the backplane 14 to the destination channel.

In the destination channel, the PPE 22 regenerates the packets from their respective envelopes and feeds them to the transmitter/receiver 20, whence they are transmitted to the network or user. The packets may be stored in a transmit queue (not shown) prior to transmission.

The router architecture just described has a number of aspects that can limit its performance. For example, the internal queues can delay data through the router if the data routes connected to the router are busy. Moreover, packets can be lost if the quantity of data received for transmission to a given destination exceeds the quantity of data that can be transmitted to this destination. Lost or discarded packets are generally acceptable in a conventional data transmission environment in which consequences of lost or delayed packets are relatively minor. For example, the receiver can simply request that a lost packet be re-transmitted. However, lost or delayed packets can be an issue for certain services, such as when the network is used to transmit packets of audio and video data, or when the network owner has entered into a service level agreement in which a given quality of service is guaranteed to a user.

It would be advantageous to increase the performance of the conventional router in a number of additionally aspects, for example:

- to provide a metering capability that does not seriously degrade the speed of the router. Such a capability would enable a user connected to the router to be billed for the quantity of data transmitted or received from the network and could optionally additionally provide the customer with data indicating the quality of service provided;
- to provide an enhanced capability for monitoring conformance with a service level agreement;
- to provide an enhanced capability to police network traffic and to reject attacks from hackers;
- to provide an ability to provide data for use in traffic engineering. For example, to determine the need to equip the network with additional or alternative hardware to deal with increased traffic or changed traffic patterns; and
- to provide an ability to alter variable routing topologies to take account of existing traffic. Conventionally, when large quantities of data are distributed among multiple routes, the routing pattern is fixed in advance and therefore cannot take into account the traffic sharing each route. For example, round-robin sequencing between multiple routes is often used.

A key to providing the above capabilities is to gather data characterizing the data transmission performance of the router and of the network. Some routers include rudimentary systems for collecting monitoring data, but the monitoring data generated by such data collection systems have such a high granularity that bursty traffic is significantly underrecorded. It is bursty traffic that most seriously taxes the transmission capabilities of a network. More sophisticated monitoring data can be collected using external test devices, such as the test devices sold under the brand names acceSS7 and accessATM/IP by Agilent Technologies, Inc., the assignee of this disclosure. However, such test devices are inconvenient to use because the interruption of the connections between the channel cards of the router and the network or user. Moreover, such text devices are expensive since they duplicate a substantial portion of the circuitry of the router. It would be expensive to use such test devices to monitor the performance of the number of routers that would be required to provide an accurate picture of the network performance and to provide the above additional features.

Thus, what is needed is a router having inexpensive, built-in monitoring data gathering so that one or more of the above capabilities can be provided. What is also needed is such a router whose built-in monitoring data gathering easily scales as the speed and throughput of succeeding generations of routers increase in response to the exponential growth in network traffic. What is also needed is a router having built-in monitoring data gathering in which minimal modifications to the existing router architecture is required.

SUMMARY OF THE INVENTION

The invention provides a network monitoring system that comprises a network router with built-in monitoring data gathering. The network router includes channels through which data pass in packets. Each of the packets includes a packet header. The network router additionally includes a header copier and a packet generator. The header copier generates a header copy from the packet header of at least some of the packets. The packet generator receives the header copies and forms monitoring data packets from them. Each monitoring data packet additionally represents temporal data relating to the header copies included in it.

The network router may additionally comprise a time stamp generator that generates time stamps. In this case, the packet generator additionally receives the time stamps and inserts at least one of the time stamps into each of the monitoring data packets as part of the monitoring data.

Additionally or alternatively, the packet generator may form each monitoring data packet from the header copies received during a predetermined interval of time to provide the temporal data.

The network monitoring system may additionally comprise a monitoring data processor connected to receive the monitoring data packets.

The monitoring data packets may pass to the monitoring data processor via a lateral signal path.

Alternatively, the monitoring data processor may be configured to appear as a channel of the network router, and the monitoring data packets may be packaged for transport through the network router to the monitoring data processor. As another alternative, the monitoring data packets may be packaged for transport through the network router to a channel of the network router, whence the monitoring data packets are transported through the network to the monitoring data processor.

The invention also provides a method of obtaining performance data relating to a data transmission network. The data transmission network includes a node. In the method, data are passed through the node in packets. Each of the packets includes a packet header. At least some of the packet headers are copied to obtain respective header copies as monitoring data from which monitoring data packets are formed. The monitoring data packets additionally represent temporal data relating to the header copies included in them. The monitoring data packets are transmitted, and the performance data are generated from the monitoring data contained in the monitoring data packets.

The monitoring data packets may be transmitted within the node, and may additionally or alternatively be transmitted through the network.

Time stamps may additionally be generated and at least one of the time stamps may be inserted into each of the monitoring data packets as part of the monitoring data.

Additionally or alternatively, each of the monitoring data packets may be formed from the header copies made during a predetermined time to provide the temporal data.

DETAILED DESCRIPTION OF THE INVENTION

Embodiments of a network monitoring system according to the invention that includes at least one router with built-in monitoring data gathering will now be described with reference to the drawings. In the drawings, like elements are indicated by the same reference numerals. In this disclosure, a router interconnects one or more networks and one or more users. A router transports sets of data called, for example, packets, frames, cells or protocol data units. In this disclosure, the term packet will be used to describe such sets of data. A common feature of the different ways in which data are transported through a network and between a network and a user is that each packet includes data fields that represent such things as address information, control information, protocol information, etc. in addition to the data being transported. In this disclosure, the term header is used to denote such fields and the term payload data is used to denote the data being transported.

The invention is based on the observation that the headers of the packets received by and transmitted by a router can provide much of the monitoring data required to analyze the performance of the network and its components. The invention is based on the additional observation that the headers represent a relatively small fraction of the size of the packets and so can be copied and transported to a monitoring data processor without significantly increasing the overall number of data handled by the router.

Figure 2:
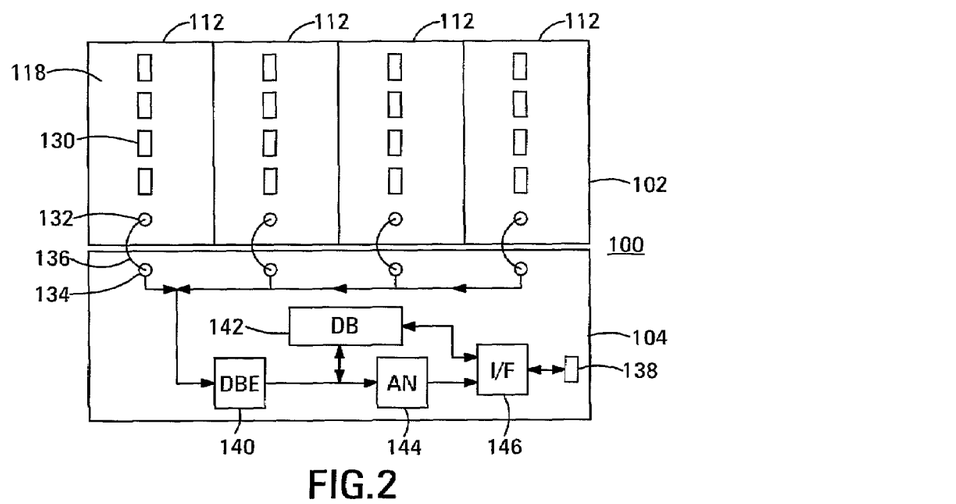
FIG. 2 is a block diagram of a first embodiment of a network monitoring system according to the invention.

FIG. 2 shows an example of a first embodiment 100 of a network monitoring system according to the invention. In the example shown, the network monitoring system 100 is composed of the router 102 with built-in monitoring data gathering and the monitoring data processor 104. The example of the router shown is composed of four channel cards 112 each of which processes four channels. The number of channel cards in the router and the number of channels per card may differ from the example shown. The channel cards are connected to a backplane (not shown) that enables data to pass from one channel to another.

An exemplary one of the channel cards that will now be described in more detail is shown at 118. The other channel cards are similar to the exemplary channel card 118. Each of the channels of the exemplary channel card includes a network connector for connecting to a user or a network. An exemplary network connector is shown at 130. The connection may be made via a cable, an optical fiber or some other suitable form of connection. The exemplary channel card also includes the monitor port 132.

The monitoring data processor 104 includes an input/output port corresponding to each monitoring data port of the router 102 and connected thereto by a link. The input/output port and link corresponding to the monitor port 132 are shown at 134 and 136, respectively. The monitoring data processor also includes the communication port 138 through which the monitoring data processor can receive instructions and can transmit the performance data generated from the monitoring data received from the router 102. The monitoring data processor can also receive via the communication port the performance data or monitoring data generated by the monitoring data processors connected to other routers or independent monitoring data processors. The communication port is typically a network port such as an Ethernet port.

The monitoring data processor 104 is typically a member of a hierarchical structure of interconnected monitoring data processors. A four-level hierarchical structure of monitoring data processors would typically be used to monitor the performance of a typical large network.

Figure 3:
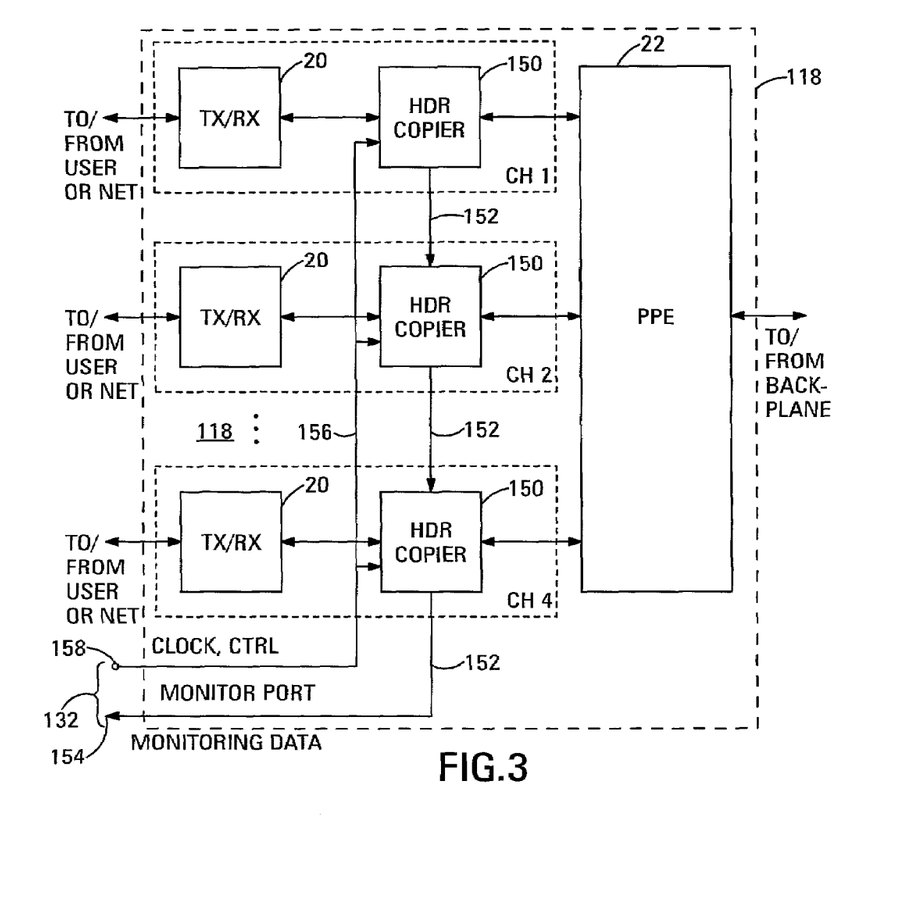
FIG. 3 is a block diagram of an example of a router channel card in the network monitoring system shown in FIG. 2.

FIG. 3 shows details of the exemplary channel card 118. The channel card includes the transmitter/receiver 20 for each of the channels CH1–CH4 on the channel card and the packet processing engine (PPE) 22. Channel CH3 has been omitted to simplify the drawing. The channel card may include more or fewer channels than the number shown. The channel card additionally includes an address memory and output queue connected to the PPE in a manner similar to the arrangement shown in FIG. 1B. However, these elements have been omitted from FIG. 3 to simplify the drawing.

In each channel of the channel card 118, the header copier 150 is interposed between the transmitter/receiver 20 and the PPE 22. The header copiers on the channel card are each connected to the lateral data path 152. The output of the lateral data path is connected to the monitoring data output 154 of the monitoring port 132.

The header copiers 150 on the channel card 118 are also connected to the clock and control signal path 156 through which they receive the clock signal CLOCK and the control data CTRL from the clock and control signal input 158 of the monitoring port 132. The clock signal may be, for example, SMPTE time code. Each header copier includes a time stamp generator (not shown) that is set and synchronized by the clock signal. Alternatively, one time stamp generator may provide time stamps to all the header copiers on one channel card via the clock and control signal path. The clock and control signal path can be additionally used to configure each header copier. For example, the path can be used to assign a unique identifier to each header copier and to set the operational parameters of its functional blocks. The operational parameters may determine, for example, the portion or portions of the headers copied by the header copier.

Although the header copiers 150 are shown as separate elements in the example shown in FIG. 3, they may alternatively be integrated with the transmitter/receiver 20 or with the PPE 22.

The remainder of the channel card 118 is conventional and will not be described further.

Figure 4:
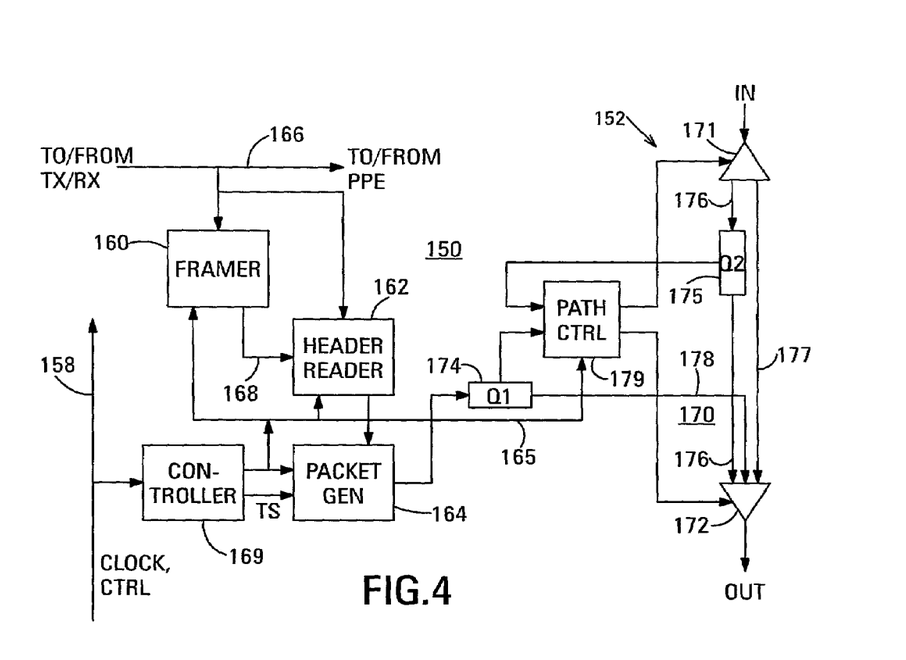
FIG. 4 is a block diagram of an example of the header copier of the channel card shown in FIG. 3.

FIG. 4 shows details of an example of the header copier 150, which will now be described with additional reference to FIG. 3. The header copier includes the framer 160, the header reader 162 and the packet generator 164 controlled by the controller 169. Also shown is the portion 170 of the lateral data path 152 corresponding to the header copier 150.

The controller 169 receives the clock and control signal CLOCK, CTRL from the clock and control signal path 158. Control data in the clock and control signal can include a unique identification number for the header copier and instructions for configuring components of the header copier 150. Included in the controller 169 is a time stamp generator (not shown) that is set and synchronized by the clock signal CLOCK. The controller feeds time stamps TS generated by the time stamp generator in response to the clock signal to the packet generator 164. The controller additionally feeds control signals to control the operation of the framer 160, the header reader 162, the packet generator 164 and the path controller 179 to these components via the bus 165.

The framer 160 and the header reader 162 have inputs connected as a side-branch to the data path 166 between the transmitter/receiver 20 and the PPE 22. A suitable buffer may be interposed between the data path 166 and the inputs of the framer and the header reader.

The framer 160 performs a framing operation on the data stream received from the transmission path 166 to determine the boundaries of the packets. The data stream may be a stream of data in ATM, Ethernet, SONET or other data transmission format. The framer feeds a packet boundary control signal indicating the packet boundaries to the header reader 162 via the path 168.

For example, when the data stream is in the Ethernet format, in which the start and end of each packet is indicated by a SOP byte and an EOP byte, respectively, the framer changes the state of the packet boundary control signal in response to the SOP byte, and restores the packet boundary control signal to its original state in response to the EOP byte.

In response to the packet boundary control signal, the header reader 162 performs a header read operation to read the header of each packet in the data stream received from the transmission path 166. The header includes data indicating the destination, in network terms, of the packet and the length of the packet. Alternatively, only a portion or portions of the header that contain data of interest may be read. References to a header will be understood to encompass a portion of a header when such portion of a header is read. The header reader makes a header copy of each header and feeds the header copy to the packet generator 164. The header copies constitute at least part of the monitoring data.

For example, when the data stream is in the Ethernet format, the header reader 162 can read the first n bytes it receives after the packet boundary control signal changes state. Alternatively, the header reader can read the first p bytes, ignore the next q bytes and read the next r bytes after the packet boundary control signal changes state. The header reader can also include a counter (not shown) that counts the number of bytes received while the packet boundary control signal is in its changed state. In this case, the header reader would append the resulting byte count to the header copy and would feed the resulting monitoring data to the packet generator 164.

The packet generator 164 receives successive time stamps TS generated by the time stamp generator (not shown) in the controller 169 and appends the most recent time stamp to each header copy received from the header reader 162. The time stamps additionally constitute part of the monitoring data. The packet generator also packages the monitoring data for transmission via the lateral data path 152 to the monitor port 132. For example, the packet generator may form a monitoring data packet containing several header copies and their time stamps. Monitoring data packets can have the same structure as the packets processed by the router but their type identifier identifies them as monitoring data packets. The packet generator feeds the monitoring data packets to the monitor port 132 via the lateral data path 152.

The packet generator 164 may also add a unique identification number to the monitoring data packet to identify the channel of the router 102 from which the header copies included in the monitoring data packet were read. The packet generator may additionally generate a checksum for each monitoring data packet and include the checksum in the monitoring data packet. The packet generator may alternatively package the header copies and their time stamps in other suitable ways.

The packet generator 164 can optionally compress the monitoring data prior to forming the monitoring data packets to reduce the number of data transferred to the monitor port 132 through the lateral data path 152.

The packet generator 164 and controller 169 are shown in FIG. 4 as being part of the header copier 150 of one of the channels on the channel card 118. However, this is not critical to the invention. A single packet generator and controller may be shared among all, or a subset, of the channels on the channel card.

FIG. 4 also shows an example of the portion 170 of the lateral data path 152 that passes through the header copier 150 of channel N, which is one of the channels on the channel card 118. The portions of the lateral data 152 path that pass through the remaining header copiers on the channel card 118 are identical, except for the portion of the lateral data path that passes through the header copier of channel CH1. In the portion of the lateral data path that passes through the header copier of channel CH1, the multiplexers 171 and 172, the data queues 174 and 175 and the path controller 179 are omitted, and the output of the packet generator 164 is connected directly to the monitoring data output OUT of channel CH1.

The lateral data path portion 170 includes the demultiplexer 171, the multiplexer 172, the data queues 174 and 175, the paths 176, 177 and 178, and the path controller 179. The path controller controls the demultiplexer and the multiplexer in response to fullness signals that indicate the fullness of the data queues 173 and 174, respectively.

The demultiplexer 171 has an input connected to the input IN of the lateral data path portion 170, first and second outputs connected to the paths 176 and 177, respectively, and a control input connected to one output of the path controller 179. The multiplexer 172 has first, second and third inputs connected to paths 176, 177 and 178, respectively. The multiplexer 172 has an output connected to the output OUT of the lateral data path portion 170 and a control input connected to one output of the path controller. The output of the packet generator 164 is connected to the path 178. The data queues 174 and 175 are respectively connected in series with the paths 178 and 176.

Normally, demultiplexer 171 is switched by the path controller 179 to direct the monitoring data packets it receives at its input to the second output connected to the path 177, and the multiplexer 172 is switched by the path controller to direct the monitoring data packets received at its second input via path 177 to its output.

Monitoring data packets generated by the packet generator 164 are stored in the data queue 174. When the path controller 179 detects that the data queue 174 is full, it switches the demultiplexer 171 to direct the monitoring data packets received at the input of the demultiplexer to the first output connected to the data queue 175 via the path 176. The received monitoring data packets accumulate in the data queue 175. At same time, the path controller switches the multiplexer 172 to receive the monitoring data packets stored in the data queue 174 via the third input connected to the path 178.

When the path controller detects that the data queue 174 empty, it switches the multiplexer 172 to receive the monitoring data packets accumulated in the data queue 175 via the first input connected to the path 176. Meanwhile, additional monitoring data packets generated by the packet generator 164 accumulate in data queue 174.

When the path controller detects that the data queue 175 is empty, it switches the demultiplexer 171 and multiplexer 172 to their original states, described above.

The lateral data path 152 may include a conventional high-speed bus structure or another suitable data transfer structure instead of the exemplary data transfer structure shown.

Since the number of data included in the headers of the packets transmitted or received by each channel of the router 102 is typically small compared with the overall number of data transmitted or received by the channel, the lateral data path 152 is required to operate no faster than the data path 166 even when there are several channels on each channel card. For example, when the headers represent about 5% of the total data, the lateral data path can transmit the header copies read from over 16 channels without exceeding the speed of the data path 166.

The header copier 150 is described above as copying the headers of all packets passing between the transmitter/receiver 20 and the packet processing engine 22. The number of the monitoring data may be reduced by configuring the header copier not to copy the headers of all the packets. For example, the header copier may be configured to copy the header of every n-th packet, or to copy the headers of randomly-selected packets that constitute a chosen fraction of the total number of packets.

The header copier 150 is described above as adding a time stamp to each header copy. The time stamps provide temporal data regarding the header copies included in the monitoring data packets. These temporal data may be provided in ways different from adding a time stamp to each header copy, however. For example, when the temporal resolution with which the monitoring data are analyzed is relatively coarse, it is not necessary to know the time at which each header copy was made with a precision that is substantially greater than that of the temporal resolution of the analysis. In this case, the header copier 150 may be simplified to omit the time stamp generator. Instead, the header copier operates in response to the controller 169 to generate each monitoring data packet from all the header copies made in a predetermined time. The header copier then sends the monitoring data packet to the monitoring data processor 104 through the lateral data path 152, whose delays are assumed to be small relative to the predetermined time. The predetermined time provides the temporal data relating to the header copies included in the monitoring data packet.

In an example in which the monitoring data processor 104 analyzes the monitoring data to determine the network traffic in five minute intervals, for example, the predetermined time may be ten seconds. The monitoring data processor simply performs its analysis using the monitoring data in all the monitoring data packets it receives in each five-minute interval.

In embodiments of the monitoring data system, to be described below, in which the monitoring data packets are transmitted to the monitoring data processor through the network, the possibility of transmission delays makes it desirable for the monitoring data to include time stamps. However, instead of adding a time stamp to each header copy, the header copier 150 may be configured to reduce the number of monitoring data by generating each packet of monitoring data from all the header copies made in a predetermined time, and to include a single time stamp in the monitoring data packet. Alternatively, the header copier may be configured to generate each monitoring data packet from a predetermined number of header copies and to include a single time stamp in the monitoring data packet. In these cases, the time stamp provides the temporal data relating to the header copies included in the monitoring data packet.

Referring once more to FIG. 2, the monitoring data processor 104 receives the monitoring data from the multiple channels on each channel card via the input/output port 134. The monitoring data processor includes the data base engine 140 that builds the data base 142 from the monitoring data in the monitoring data packets received from the router 102. The data base engine puts the different items included in the monitoring data, such as the header copies and the time stamps, in different fields of the data base. The data base can include fields for such items as source address, destination address, packet size and packet type.

The monitoring data processor 104 may additionally include the analysis engine 144 that analyzes the portion of the data base 142 generated from the monitoring data gathered by the router 102 to determine such performance data as:
  router latency, mean or sigma—the transit time from the port of the router at which the packet is received to port of the router from which the packet was transmitted;
  router packet loss—the number of packets received by the router that were never transmitted by the router; and
  router throughput—mean, sigma, peak—a count of the number of bits transmitted obtained by multiplying the number of packets by the packet size included in the monitoring data. The packet size is read from header or determined by the header copier 150, as described above.

The above performance data characterize the performance of the router 102.

The monitoring data processor 104 may additionally receive additional data from one or more other monitoring data processors (not shown) via the communication port 138 and the interface 146, which may be a network interface. The additional data may include either or both of monitoring data and performance data derived by analyzing such monitoring data. The data base 142 may additionally include the additional data received via the communication port.

The analysis engine 144 can additionally analyze the portion of the data base 142 generated from the monitoring data gathered by the router 102 and generated from the additional data supplied to the monitoring data processor 104 by the other monitoring data processors to determine such performance data as:
  network latency, mean or sigma—the transit time of a packet from one node of the network to another;
  network packet loss—the number of packets transmitted from one node of the network that are not received by the indicated destination node; and
  network throughput—mean, sigma, peak—a count of the number of bits transmitted between two nodes of the network obtained by multiplying the number of packets by the packet size included in the monitoring data. The packet size is read from header or determined by the header copier 150, as described above.

The above performance data characterize the performance of the network.

The analysis engine 144 can additionally analyze the portion of the data base 142 generated from the monitoring data gathered by the router 102 and generated from the additional data supplied to the monitoring data processor 104 by the other monitoring data processors (not shown) to identify ones of the monitoring data and the additional data that include header copies having identical source and destination addresses. Such header copies belong to packets transmitted through a connection provided by the network between the source and the destination. The analysis engine can generate from the identified ones of the monitoring data and the additional data such performance data as:
  connection latency, mean or sigma—the transit time of a packet through the connection;
  connection packet loss—the number of packets transmitted from the source that are not received by the destination; and
  connection throughput—mean, sigma, peak—a count of the number of bits transmitted through the connection.

The above performance data characterize the performance of the connection through the network between the source and the destination.

Some of the above performance data can optionally be combined to generate an overall quality of service metric for the network.

The monitoring data processor 104 may additionally transmit all or parts of the data base 142 and the performance data generated by the analysis engine 144 to other monitoring data processors via the communication port 138 and the interface 146 as additional data for the other monitoring data processors.

Billing data can be generated from the connection performance data without slowing the performance of any of the routers being monitored.

Data processing techniques for performing the above analyses and for generating billing data are known in the network monitoring art and therefore will not be described here.

When the monitoring data included in the monitoring data packets have been subject to compression, as described above, the monitoring data processor 104 additionally includes a data expander configured to expand the compressed monitoring data.

Figure 5:
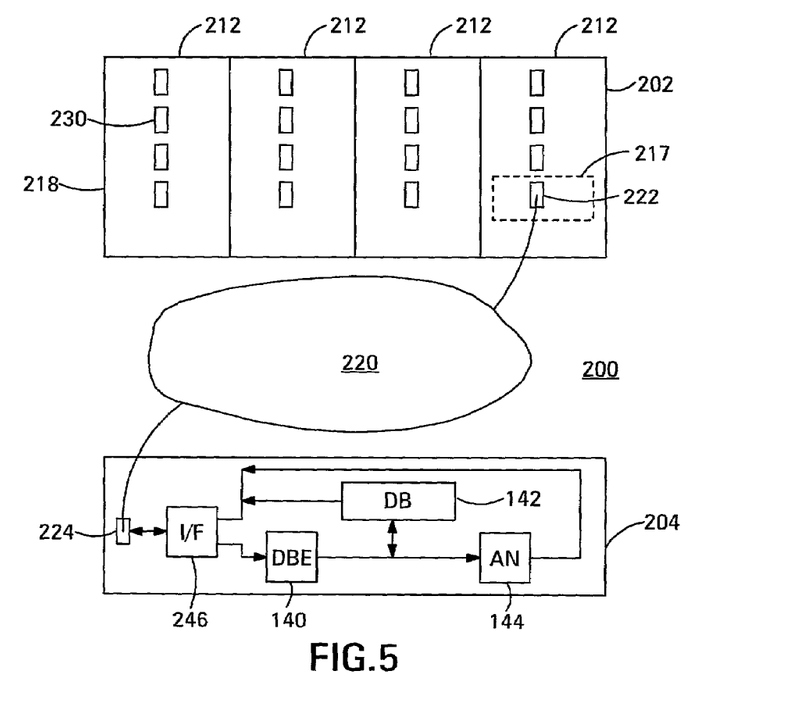
FIG. 5 is a block diagram of a second embodiment of a network monitoring system according to the invention.

FIG. 5 shows an example of a second embodiment 200 of a network monitoring system according to the invention. The network monitoring system 200 includes the router 202 and the monitoring data processor 204.

The monitoring data generated from all the channels of the router 202 pass through the fabric of the router to one channel of the router, whence the monitoring data are fed to the monitoring data processor 204. In the example shown, the monitoring data pass through the fabric of the router to the output channel 217. The monitoring data are fed from the output channel through the network 220 to the monitoring data processor 204. The monitoring data passed to the output channel 217 may alternatively be fed to the monitoring data processor via a non-network connection, such as a cable, an optical fibre or some other suitable connection, extending between the connector 222 on the output channel to the network port 234 on the monitoring data processor.

In the example shown, the router 202 is composed of four channel cards 212 each of which processes four channels. The number of channel cards in the router and the number of channels per card may differ from the example shown. The channel cards are connected to a backplane (not shown) through which envelopes of data pass from one channel to another. A connector for connecting one channel of the exemplary channel card 218 to a user or a network is shown at 230. The connection may be made via a cable, an optical fiber or some other suitable form of connection.

Channel 217 of the router 202 is connected to the network 220 and is used as an output channel to transmit the monitoring data gathered by the router 202 to the monitoring data processor 204 or to one or more additional destinations. The connector 222 of the output channel is shown connected to the network. The monitoring data are transmitted in conventional network-compatible monitoring data packets whose type identifier identifies them as monitoring data packets. When the number of monitoring data is small, the unused capacity of the output channel may be used to transmit or receive other data. When the number of monitoring data exceeds the transmission capacity of a single output channel, more than one output channel is required. Even when the number of output data is insufficient to fully load a single output channel, different portions of the monitoring data may be transmitted to different destinations via more than one of the channels of the router, each acting as an output channel. Again, the unused capacity of the output channels may be used to transmit or receive other data.

The monitoring data processor 204 includes the network port 234 through which it is connected to the network 220. In the example shown, the network port is connected via the network interface 246 to the data base engine 140 and the analysis engine 144. The router 202 may transmit the monitoring data to the monitoring data processor, as will be described below.

The monitoring data processor 204 may be connected by the network port 234 and the network 220 to other monitoring data processors (not shown) in a hierarchical structure that enables performance data for an entire network (not shown) to be generated, as described above. The monitoring data processor may alternatively be connected to one or more of such other monitoring data processors by another network or by some other interconnection scheme.

The monitoring data processor 204 may receive additional data, which may include either or both monitoring data and performance data from one or more of the other monitoring data processors (not shown). In addition, the monitoring data processor 204 may transmit monitoring data or performance data to one or more of other monitoring data processors as additional data for the other monitoring data processors. The performance data are obtained by analyzing the monitoring data.

The invention is based on the additional observation that the packet processing engine (PPE) of the router already performs a framing operation, reads the headers of the packets and puts the received packets into envelopes for transfer through the backplane to another channel. Since the number of data included in the headers is generally small compared with the overall number of data handled by the router, using the existing fabric of the router to copy the headers and transport the header copies via the backplane to an output channel for transmission to a monitoring data processor enables the monitoring data to be gathered at the expense of a relatively small decrease in the overall payload data throughput of the router. Alternatively, gathering the monitoring data this way would require a relatively small increase in the hardware performance of the router to maintain the original payload data throughput.

Figure 6A:
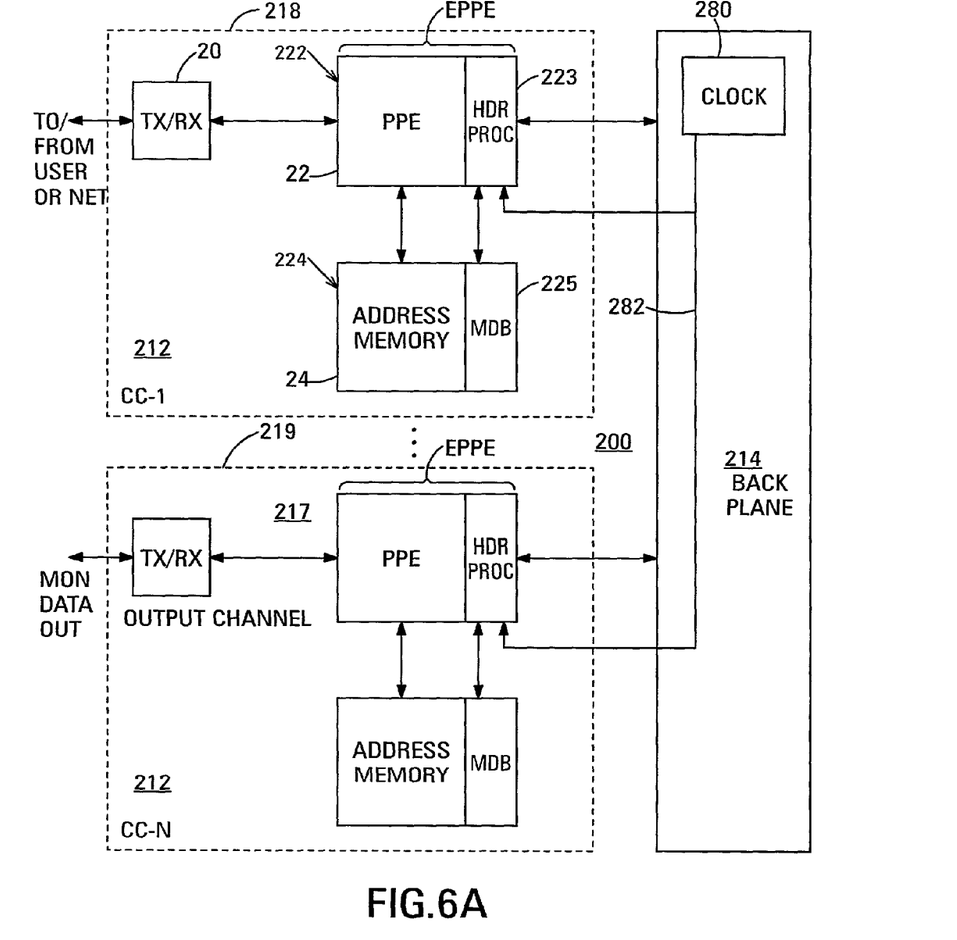
FIG. 6A is a block diagram of an example of a router in the network monitoring system shown in FIG. 5.

FIG. 6A is a block diagram showing an example of the router 202 in greater detail. This example will now be described with additional reference to FIG. 5. The router includes the channel cards 212 and the backplane 214. The channel cards 218 and 219 are shown as examples of the channel cards 212. The output channel 217 through which the gathered monitoring data are fed via the network 202 to the monitoring data processor 204 is located on the channel card 219. The router would typically include channel cards in addition to those shown, but these have been omitted to simplify the drawing. The channel cards may each handle more than the single channel shown.

The router 202 additionally includes the clock generator 280 whose output is connected to the clock signal track 282 on the backplane 214. The clock generator generates a clock signal that is distributed to the channel cards 212 via the clock signal track 282. The clock signal track may be a single additional track on the backplane and so is relatively easy to accommodate. The clock signal generator is shown located on the backplane 214. Alternatively, it may be located on one of the channel cards to minimize the changes that need to be made to the backplane.

The channel card 218 will now be described. The channel card 219 may be similar. The channel card 218 includes the transmitter/receiver 20, the enhanced packet processing engine (EPPE) 222 and the card memory 224. The channel card will typically include more than one transmitter/receiver sharing a common EPPE. Only one transmitter/receiver is shown to simplify the drawing. The channel card will typically include an output data queue between the EPPE and the backplane 214, but this has been omitted to simplify the drawing.

The enhanced packet processing engine 222 includes the conventional packet processing engine (PPE) 22, described above, together with the header processor 223. A fixed fraction of the resources of the EPPE may be allocated to the header processor. Alternatively, the resources of the EPPE may be dynamically allocated between the PPE and the header processor. However, when this is done, the allocation is controlled so that the resources allocated to the header processor do not fall below a minimum.

The card memory 224 is partitioned between the conventional address memory 24 and the monitoring data buffer 225. A fixed fraction of the card memory may be allocated to the monitoring data buffer. Alternatively, the card memory may be dynamically allocated between the address memory and the monitoring data buffer. However, when this is done, the allocation is controlled so that the card memory allocated to the monitoring data buffer does not fall below a minimum. The minimum resource allocations to the header processor 223 and monitoring data buffer 225 ensure that the monitoring data continue to be gathered even when the traffic flow through the channel card 218 is at a peak.

Figure 6B:
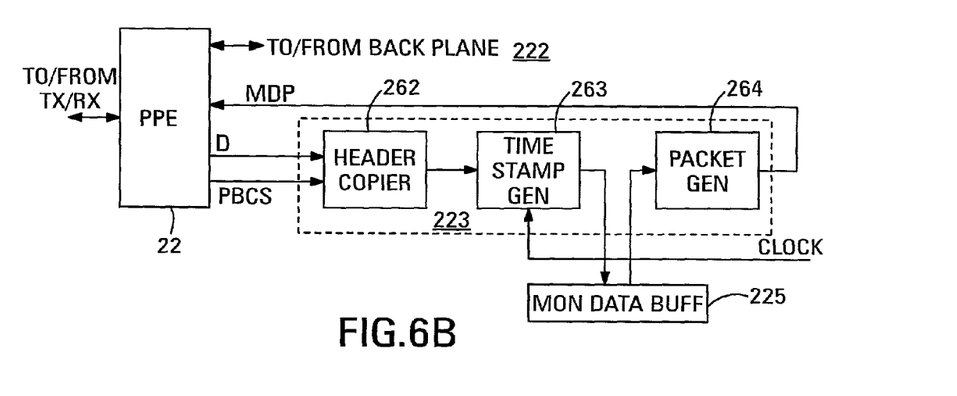
FIG. 6B is a block diagram of an example of the header processor of the router shown in FIG. 6A.

FIG. 6B is a block diagram showing an example of the EPPE 222, including the header processor 223, in more detail. The header processor is composed of the header copier 262, the time stamp generator 263 and the packet generator 264.

The EPPE 222 receives a data stream from the transmitter/receiver 20 and the PPE 22 performs the conventional framing, header reading, destination channel determination and envelope generation operations described above. The framing operation performed by the PPE generates a packet boundary control signal PBCS. The PPE feeds a data stream D and the packet boundary control signal to the header copier 262. The data stream D may be the data stream that passes between the transmitter/receiver and the PPE, or may be a copy of this data stream. In response to the packet boundary control signal, the header copier makes a copy of, or otherwise reads, the header of each packet, or of a portion of the header in which data of interest reside and feeds the header copy to the time stamp generator 263. References to a header will be understood to encompass a portion of a header when such portion of a header is read, copied or otherwise captured.

The time-stamp generator 263 is set and synchronized by the clock signal CLOCK received from the clock signal generator 280 via the clock signal track 282. The time stamp generator receives each header from the header copier 262, adds a time stamp to the header and stores the resulting monitoring data in the monitoring data buffer 225.

The packet generator 264 reads a number of the monitoring data from the monitoring data buffer 225, forms the monitoring data into a monitoring data packet addressed to the monitoring data processor 204 and feeds the monitoring data packet MDP back to the PPE 22. The PPE treats the monitoring data packet received from the packet generator as a packet of received data and puts the monitoring data packet into one or more envelopes labelled with the address of the output channel 217 of the router 202. The PPE then transfers the envelopes of monitoring data through the backplane 214 to the output channel 217, which is the channel indicated by the channel address in the envelopes.

The header processor 223 may be configured to pass some or all of the headers and time stamps directly from the time stamp generator 263 to the packet generator 264. When no headers and time stamps are stored, the monitoring data buffer 225 may be omitted.

As a further alternative, the PPE 22 may be configured to make copies of the headers or portions thereof and pass the copies to the time stamp generator 263 or to the packet generator 264.

The output channel 217 treats the envelopes of the monitoring data received as any other envelopes received from the backplane 214. The output channel extracts the monitoring data packet from the envelope or envelopes and transmits the monitoring data packet to the network. For example, the envelope containing the monitoring data packet formed from the header copies and their time stamps may be transferred through the backplane to the output channel 217 on the channel card 219 for transmission to the network.

As noted above, the headers typically represent about 5% of the data throughput of the router 202. Transmitting the envelopes containing the monitoring data through the fabric of the router would tend to slow the transmission of envelopes containing the payload data through the router by approximately this amount. The quantity of monitoring data transmitted through the router can be reduced by configuring the header processor 223 to perform processing different from that described above. For example, in some applications, it would be sufficient for the header processor to count the number of headers transmitted or received in a predetermined time. The header processor would then, at predetermined times, generate a monitoring data packet that includes the packet count and a time stamp for transfer through the router 202 to the output channel 217.

Alternatively, the header processor 223 could include a processor (not shown) that compresses or otherwise aggregates the header copies before feeding them to the packet generator 264. As a further alternative, the header copier 262 could be configured to feed to the packet generator copies of the headers of only certain types of packets, such as those having common source and destination addresses. As a yet further alternative, the header copier could be configured to feed to the packet generator copies of the headers of a sample of the packets transmitted or received. For example, the header copier could feed to the packet generator a copy of the header of every m-th packet transmitted or received or a copy the header of randomly-selected packets that constitute a chosen fraction of the total number of packets or a copy of the first header that occurs after t bits have been transmitted or received.

Moreover, also as noted above, in applications in which the time at which each header copy was made does not have to be exactly known, the packet generator 264 may be configured to form each monitoring data packet from the header copies received in a predetermined time or from a predetermined number of header copies, and to include a single time stamp in the monitoring data packet. The time stamp provides temporal data relating to the header copies included in each monitoring data packet.

The measures just described can be used to reduce the number of monitoring data fed through the fabric of the router 202 and therefore potentially increase the throughput of payload data.

The monitoring data processor 204 processes the monitoring data output by the router 202 in a manner similar to monitoring data processor 104 described above. The analyses performed by the monitoring data processor, alone or in cooperation with other monitoring data processors, are also similar to those performed by the monitoring data processor 104. Consequently, the monitoring data processor 204 will not be described further.

Figure 7:
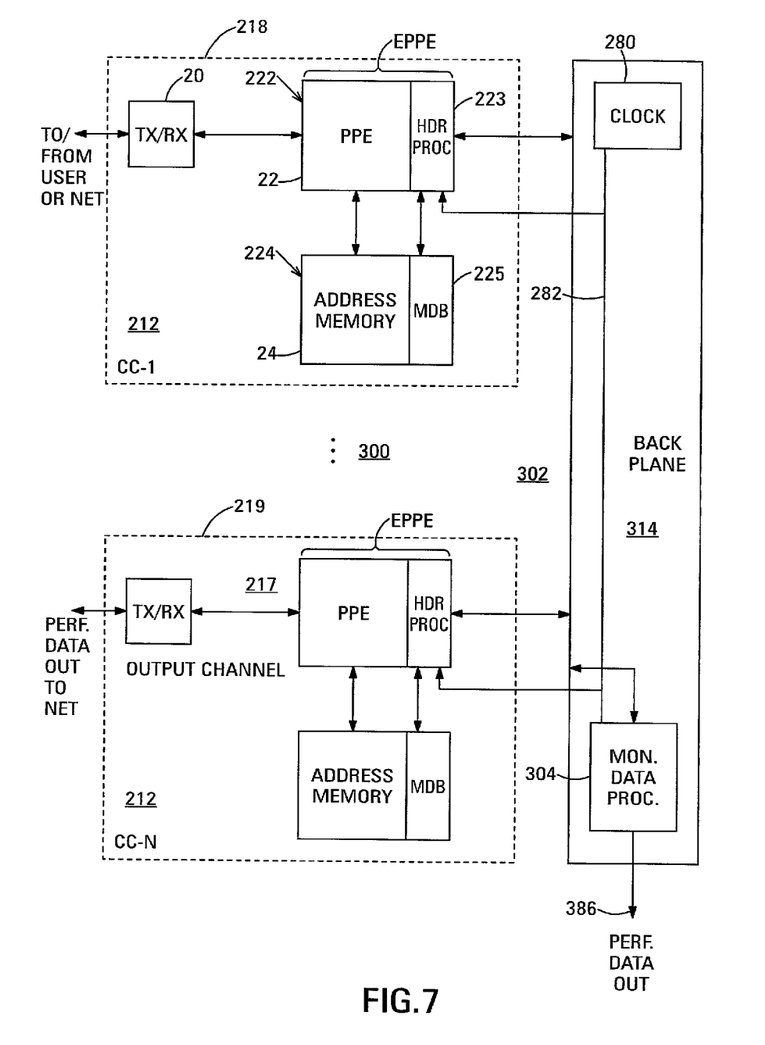
FIG. 7 is a block diagram of a third embodiment of a network monitoring system according to the invention.

FIG. 7 is a block diagram of an example of a third embodiment 300 of a network monitoring system according to the invention. The network monitoring system 300 is a variation on the network monitoring system 200 shown in FIGS. 5 and 6A. Elements of the network monitoring system shown in FIG. 7 that correspond to elements of the network monitoring system shown in FIGS. 5 and 6A are indicated using the same reference numerals and will not be described further.

In the network monitoring system 300, the internal monitoring data processor 304 is internal to the router 302. The internal monitoring data processor is preferably configured to appear to the router 302 as one of its channels and is allocated a channel address so that it can receive the envelopes of monitoring data transferred to the backplane 314 from the channel cards 212. The internal monitoring data processor can be configured to perform such tasks as header counting, header aggregation and compression, header selection and header sampling in addition to, or instead of, the header processors, such as the header processor 223, in the channel cards 212. The internal monitoring data processor 304 can additionally or alternatively have an internal structure similar to that of the monitoring data processor 204, described above, and can perform the data base building and data analysis performed by the monitoring data processor 204 described above. This would allow the external monitoring data processor 204 to be omitted.

FIG. 7 additionally shows the output of the internal monitoring data processor 304 connected to the performance data output 386. When the internal monitoring data processor is located on the backplane 314 as shown, the performance data output enables the performance data to be output directly from the backplane, in monitoring data packets, in envelopes or in some other data format. The monitoring data may be similarly output.

FIG. 7 additionally shows the output of the internal monitoring data processor 304 connected to the performance data output 386. When the internal monitoring data processor is located on the backplane 314 as shown, the performance data output enables the performance data to be output directly from the backplane, in monitoring data packets, in envelopes or in some other data format. The monitoring data may be similarly output.

In generating the performance data, the internal monitoring data processor 304 may receive additional data, which may be one or both of monitoring data and performance data, from monitoring data processors (not shown) in, or connected to, other routers of the network, as described above. Such additional data may be received in packets identified as monitoring data packets. Such packets may be received via one of the channels of the router 202 and fed through the fabric of the router to the internal monitoring data processor.

The internal monitoring data processor 304 is shown located on the backplane 314, but this is not critical to the invention. Part of one of the channel cards may be used to accommodate either or both of the internal monitoring data processor 304 and the clock signal generator 280. The performance data output 386 may also be located on one of the channel cards. Transferring the monitoring data packets in envelopes through the fabric of the router contributes to this flexibility of location.

The number of the monitoring data may be reduced in the manner described above by configuring the header processor 223 not to copy the headers of all packets. Moreover, also as noted above, in applications in which the time at which each header copy is made does not have to be exactly known, the header processor may be configured to form each of the monitoring data packets from the header copies received in a predetermined interval of time. Optionally, a time stamp may be added to each monitoring data packet.

The performance data generated by the monitoring data processors described in this disclosure may be used to control the operation of the routers in the network. For example, the performance data may be used to control the way in which the routers divide large data transmissions among multiple transmission routes, taking into account the pre-existing traffic on the routes.

The embodiments of the network monitoring system and elements thereof described in this disclosure may be constructed from discrete components, small-scale or large-scale integrated circuits, suitably-configured ASICs and other suitable hardware. Alternatively, portions of the network monitoring systems and the elements thereof may be constructed using a digital signal processor, microprocessor, microcomputer or computer with internal or external memory operating in response to a program fixed in a computer-readable medium. In computer- and DSP-based embodiments, the various elements shown herein may be ephemeral, and may only exist temporarily as the program executes. In such embodiments, the program could be conveyed to the hardware on which it is to run by embodying the program in a suitable computer-readable medium, such as a set of floppy disks, a CD-ROM, a DVD-ROM, a read-only memory or could be transmitted to such hardware by a suitable data link.

FIG. 8 is a flow chart illustrating an example of the method 400 according to the invention for obtaining performance data relating to a data transmission network that includes a node, such as a router.

Figure 8A:
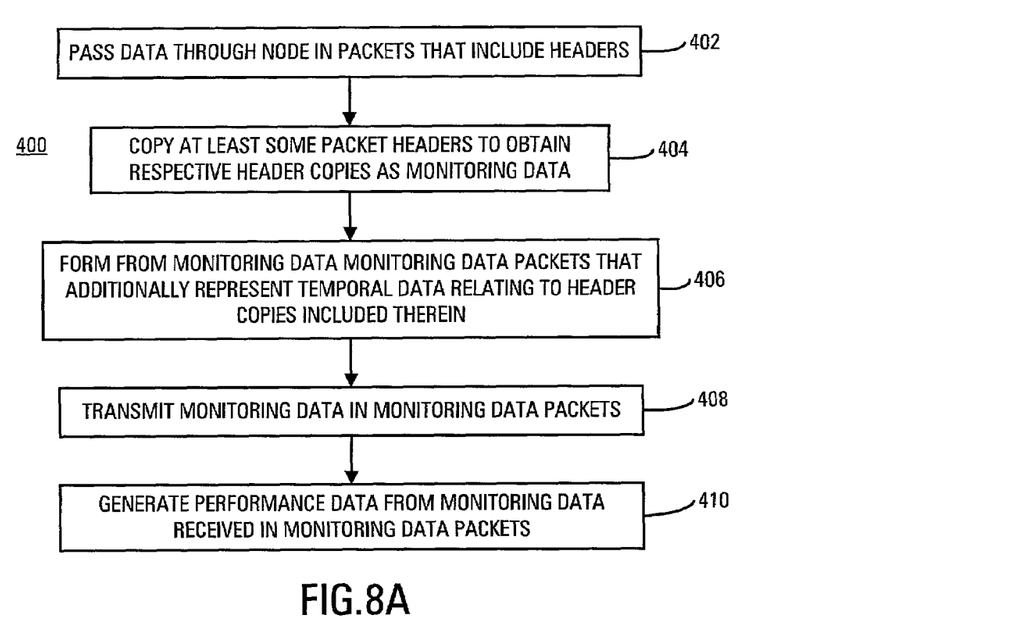
FIG. 8A is a flow chart showing an example of a method according to the invention for generating performance data relating to a data transmission network

In process 402, data are passed through the node in packets. Each of the packets includes a packet header.

In process 404, at least some of the packet headers are copied to obtain respective header copies as monitoring data.

In process 406, monitoring data packets are formed from the monitoring data. The monitoring data packets additionally represent temporal data related to the header copies included therein.

In process 408, the monitoring data are transmitted in the monitoring data packets.

In process 410, the performance data are generated from the monitoring data received in the monitoring data packets.

In process 404, all of the packet headers may be copied to obtain respective header copies.

In process 408, the packets of monitoring data may be transmitted internally within the node, or may be transmitted through the network to another node. The other node may be one at which monitoring data are gathered, or may be one at which no monitoring data are gathered, but at which performance data are generated from monitoring data gathered at other nodes.

Figure 8B:
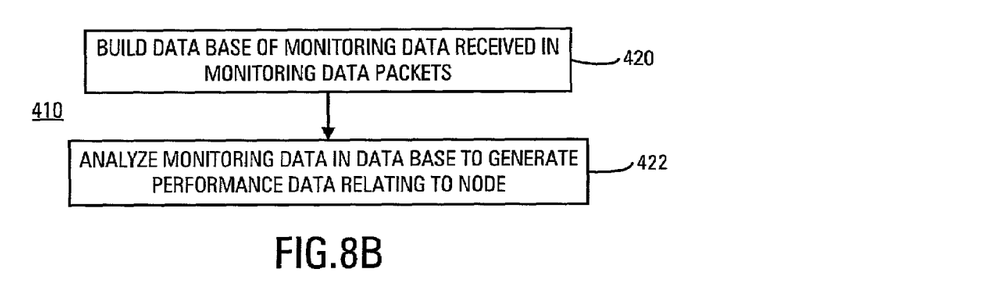
FIG. 8B is a flow chart showing a first embodiment of the performance data generating process of the method shown in FIG. 8A.

FIG. 8B illustrates a first embodiment of the performance data generating process 410.

In process 420, a data base is built of the monitoring data received in the monitoring data packets.

In process 422, the monitoring data in the data base are analyzed to generate the performance data.

The performance data may relate to the performance of the node where the performance data are gathered.

Either or both of the monitoring data and the performance data derived at least in part from the monitoring data may be transmitted to one or more other nodes of the network as additional data. This enables performance data relating to the performance of the network to be generated. Performance data relating to the performance of the network may be generated by performing hierarchical processing of monitoring data and performance data received from nodes of the network.

Figure 8C:
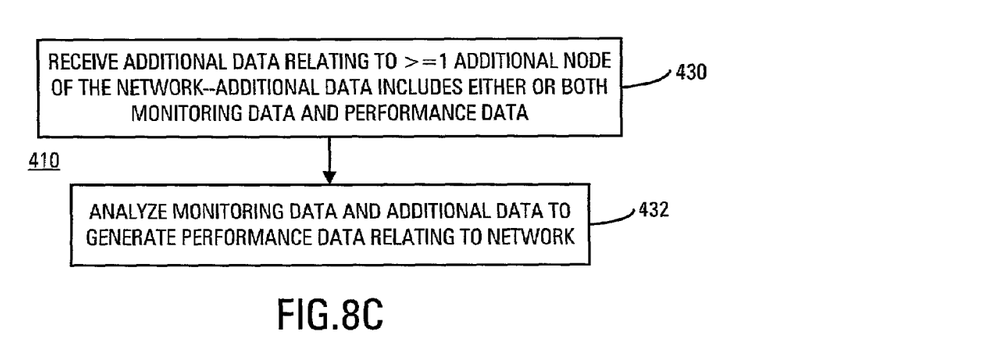
FIG. 8C is a flow chart showing a second embodiment of the performance data generating process of the method shown in FIG. 8A.

FIG. 8C illustrates a second embodiment of the performance generating process 410.

In process 430, additional data relating to at least one additional node of the network are received. The additional data include either or both monitoring data and performance data.

In process 432, the monitoring data and the additional data are analyzed to generate the performance data. The performance data generated relate to the performance of the network.

Figure 8D:
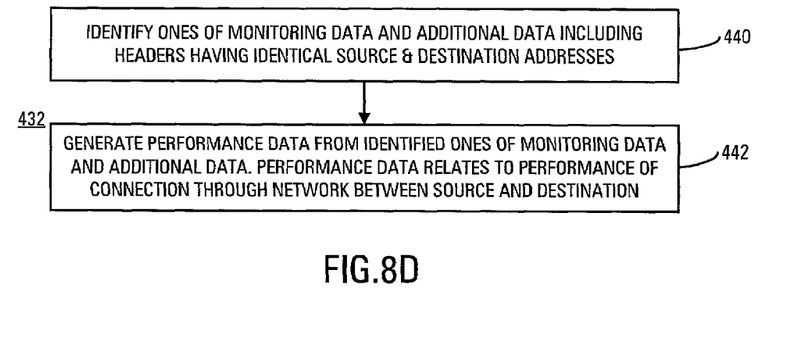
FIG. 8D is a flow chart showing an alternative embodiment of the analyzing process of the process shown in FIG. 8C to generate performance data relating to a network connection.

FIG. 8D illustrates an alternative embodiment of process 432 shown in FIG. 8C.

In process 440, ones of the monitoring data and the additional data including headers having identical source and destination addresses are identified.

In process 442, the performance data are determined from the identified ones of the monitoring data and additional data. The performance data generated relate to the performance of a connection through the network between the source and destination.

The method 400 may additionally include controlling the node of the network in response to the performance data.

Also in the method 400, billing data may additionally or alternatively be generated from the performance data and the customer may be billed using the billing data.

Figure 8E:
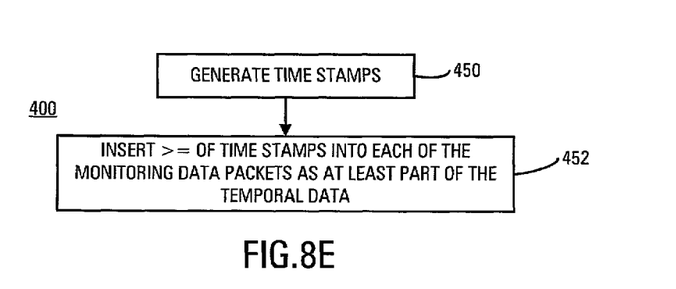
FIG. 8E is a flow chart showing additional processing that may be included in the method shown in FIG. 8A.

FIG. 8E shows optional additional processes of the method 400.

In process 450, time stamps are generated.

In process 452, at least one of the time stamps is inserted into each of the monitoring data packets as part of the monitoring data.

In process 452, one of the time stamps may be inserted for each of the header copies included in the monitoring data packet.

Figure 8F:
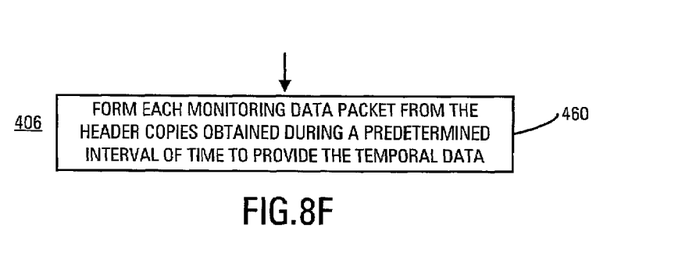
FIG. 8F is a flow chart showing an embodiment of the monitoring data packet forming process of the method shown in FIG. 8A.

FIG. 8F shows an embodiment of process 406 shown in FIG. 8A. In process 460, each of the monitoring data packets is formed from the header copies made during a predetermined interval of time to provide the temporal data.

Time stamps may additionally be generated and at least one of the time stamps inserted into each of the monitoring data packets formed in process 460. The time stamps become part of the monitoring data.

Although this disclosure describes illustrative embodiments of the invention in detail, it is to be understood that the invention is not limited to the precise embodiments described, and that various modifications may be practiced within the scope of the invention defined by the appended claims.

We claim:

1. A network monitoring system comprising a network router with built-in monitoring data gathering, the network router including:
    channels through which data pass in packets, each of the packets including a packet header;
    a header copier that generates a header copy from the packet header of at least some of the packets; and
    a packet generator that receives the header copies and forms monitoring data packets therefrom, each of the monitoring data packets additionally representing temporal data relating to the header copies included therein.

2. The network monitoring system of claim 1, in which:
    the network muter additionally includes a time stamp generator that generates time stamps; and
    the packet generator additionally receives the time stamps and inserts at least one of the time stamps into each of the monitoring data packets as part of the monitoring data.

3. The network monitoring system of claim 2, in which the packet generator inserts into each of the monitoring data packets one of the time stamps for each of the header copies included therein as part of the monitoring data.

4. The network monitoring system of claim 1, in which the packet generator forms each one of the monitoring data packets from the header copies received during a predetermined interval of time to provide the temporal data.

5. The network monitoring system of claim 4, in which:
    the network router additionally includes a time stamp generator that generates time stamps; and
    the packet generator forms each one of the monitoring data packets from the header copies received during a predetermined interval of time and additionally receives the time stamps and inserts one of the time stamps into each of the monitoring data packets, the predetermined interval of time and the predetermined interval of time collectively constituting the temporal data.

6. The network monitoring system of claim 1, in which the header copier generates a header copy from the packet headers of all of the packets.

7. The network monitoring system of claim 1, in which:
    each of the channels includes a packet processing engine that packages packets in envelopes for passage through the network router to another of the channels;
    the packet generator passes the monitoring data packets to the packet processing engine, which packages the monitoring data packets in envelopes addressed to one of the channels;
    the envelopes containing the monitoring data packets pass through the network router to the one of the channels to which they are addressed;
    the network monitoring system additionally comprises a monitoring data processor connected to the one of the channels to which the envelopes containing the monitoring data packers are addressed, the monitoring data processor including a data base engine that operates to build a data base from the monitoring data received in the monitoring data packets.

8. The network monitoring system of claim 7, in which the monitoring data processor is connected to the channel of the router by the network.

9. The network monitoring system of claim 1, in which:
    the network router additionally includes:
    in each of the channels, a packet processing engine that packages packets in envelopes for passage through the network router to another of the channels, and
    a monitoring data processor configured to appear as an additional one of the channels, the monitoring data processor including a data base engine that operates to build a data base from the monitoring data received in the monitoring data packets;
    the packet generator passes the monitoring data packets to the packet processing engine, which packages the monitoring data in envelopes addressed to the monitoring data processor; and
    the envelopes containing the monitoring data packages pass through the network router to the monitoring data processor.

10. The network monitoring system of claim 1, additionally comprising a monitoring data processor connected to receive the monitoring data packets and including a data base engine that operates to build a data base from the monitoring data included in the monitoring data packets.

11. The network monitoring system of claim 10, in which the monitoring data processor additionally includes an analysis engine for analyzing the monitoring data in the data base to generate performance data relating to the network router.

12. The network monitoring system of claim 10, in which:
the network router is a first network router and is connected to a network that includes at least one second network router with built-in monitoring data gathering;
the monitoring data processor additionally includes:
a communications port connected to receive additional data from the at least one second network router, the additional data including at least one of (a) monitoring data and (b) performance data; and
an analysis engine that analyzes the monitoring data and the additional data to generate performance data relating to performance of the network.

13. The network monitoring system of claim 12, in which the analysis engine additionally operates to identify ones of the monitoring data and the additional data including headers having identical source and destination addresses, and generates the performance data from the identified ones of the monitoring data and additional data, the performance data generated relating to the performance of a connection through the network between the source and destination.

14. The network monitoring system of claim 10, in which the monitoring data processor is a first monitoring data processor and additionally includes a communications port configured to feed at least one of (a) the data base and (b) performance data generated at least in part from the data base to a second monitoring data processor.

15. The network monitoring system of claim 14, in which the communications port is connected to the network.

16. The network monitoring system of claim 14, in which the first monitoring data processor and the second monitoring data processor are elements of a hierarchical structure of monitoring data processors.

17. A method of obtaining performance data relating to a data transmission network including a node, the method comprising:
passing data through the node in packets, each of the packets including a packet header;
copying at least some of the packet headers to obtain respective header copies as monitoring data;
forming monitoring data packets from the monitoring data, each of the monitoring data packets additionally representing temporal data relating to the header copies included therein;
transmitting the monitoring data packets; and
generating the performance data from the monitoring data contained in the transmitted monitoring data packets.

18. The method of claim 17, in which, in transmitting the monitoring data, the monitoring data packets are transmitted within the node.

19. The method of claim 17, in which, in transmitting the monitoring data, the monitoring data packets are transmitted through the network.

20. The method of claim 17, in which generating the performance data includes:
building a data base of the monitoring data received in the monitoring data packets; and
analyzing the monitoring data in the data base to generate the performance data.

21. The method of claim 17, additionally comprising transmitting at least one of (a) the data base and (b) performance data derived at least in part from the data base to at least one other node of the network.

22. The method of claim 17, in which generating the performance data includes performing hierarchical processing of data bases and performance data received from nodes of the network.

23. The method of claim 17, in which, in generating the performance data, the monitoring data are analyzed to generate performance data relating to performance of the node.

24. The method of claim 17, in which generating the performance data includes:
receiving additional data relating to at least one additional node in the network, the additional data including at least one of monitoring data and performance data; and
analyzing the monitoring data and the additional data to generate the performance data, the performance data generated relating to performance of the network.

25. The method of claim 24, in which analyzing the monitoring data and the additional data includes:
identifying ones of the monitoring data and the additional data including headers having identical source and destination addresses; and
generating the performance data from the identified ones of the monitoring data and the additional data, the performance data relating to performance of a connection through the network between the source and destination.

26. The method of claim 17, additionally comprising controlling operation of the node in response to the performance data.

27. The method of claim 17, additionally comprising:
generating billing data from the performance data; and
billing a customer using the billing data.

28. The method of claim 17, additionally comprising:
generating time stamps; and
inserting at least one of the time stamps into each one of the monitoring data packets.

29. The method of claim 28, in which, in inserting at least one of the time stamps into each one of the monitoring data packets, one of the time stamps is inserted for each of the header copies included therein.

30. The method of claim 17, in which, in forming monitoring data packets from the monitoring data, each one of the monitoring data packets is formed from the header copies made during a predetermined time to provide the temporal data.

31. The method of claim 30, additionally comprising:
generating time stamps; and
inserting one of the time stamps into each one of the monitoring data packets.

32. The method of claim 17, in which, in copying at least some of the packet headers, all the packet headers are copied.

* * * * *